Sept. 21, 1965 A. R. CHASAR 3,207,331

FRAME STRUCTURE FOR MECHANICAL STORAGE SYSTEM

Filed Oct. 26, 1962 7 Sheets-Sheet 1

INVENTOR.
ANTHONY R. CHASAR
BY
Meyer, Baldwin, Doran & Egan
ATTORNEYS.

FRAME STRUCTURE FOR MECHANICAL STORAGE SYSTEM

Filed Oct. 26, 1962 7 Sheets-Sheet 2

INVENTOR.
ANTHONY R. CHASAR
BY
Meyer, Baldwin, Doran & Egan
ATTORNEYS

Sept. 21, 1965 A. R. CHASAR 3,207,331

FRAME STRUCTURE FOR MECHANICAL STORAGE SYSTEM

Filed Oct. 26, 1962 7 Sheets-Sheet 3

INVENTOR.
ANTHONY R. CHASAR
BY
Meyer, Baldwin, Doran & Egan
ATTORNEYS.

INVENTOR.
ANTHONY R. CHASAR
BY
Meyer, Baldwin, Doran & Egan
ATTORNEYS.

Sept. 21, 1965 A. R. CHASAR 3,207,331

FRAME STRUCTURE FOR MECHANICAL STORAGE SYSTEM

Filed Oct. 26, 1962 7 Sheets-Sheet 5

INVENTOR.
ANTHONY R. CHASAR
BY
Meyer, Baldwin, Doran & Egan
ATTORNEYS.

FRAME STRUCTURE FOR MECHANICAL STORAGE SYSTEM

Filed Oct. 26, 1962 7 Sheets-Sheet 6

INVENTOR.
ANTHONY R. CHASAR
BY
Meyer, Baldwin, Doran & Egan
ATTORNEYS.

INVENTOR.
ANTHONY R. CHASAR
BY
Meyer, Baldwin, Doran & Egan
ATTORNEYS.

3,207,331
FRAME STRUCTURE FOR MECHANICAL STORAGE SYSTEM

Anthony R. Chasar, Mentor Village, Ohio, assignor to The Triax Company, Cleveland, Ohio, a corporation of Ohio Filed Oct. 26, 1962, Ser. No. 233,418
10 Claims. (Cl. 214—16.4)

This invention relates to storage structures and particularly to a frame structure for use in a mechanical storage system.

The storage system referred to comprises, basically, a frame structure defining parallel rows of vertically and horizontally aligned storage openings disposed on either side of an aisle. A carrier is provided which is adapted to move a load vertically and horizontally in said aisle and laterally from said aisle into any selected one of said storage openings. For reasons of economy, visibility, and efficient use of space, the frame structure is of the open type wherein the load support means at each storage opening comprises a pair of parallel, spaced ledge members across which a pallet or load is adapted to be bridged. The ledge members are channel shaped whereby a frame of the carrier can move laterally in-between said members to be captively held and supported thereby during loading and unloading.

The carrier is mechanically operated and is preferably automatically controlled to deliver loads to or retrieve them from a selected storage opening in the manner, for example, as set forth in my copending application Serial No. 66,776, filed November 2, 1960, now Patent No. 3,139,994, and entitled Mechanical Load Handling, Transfer and Storage Equipment.

In a storage system of the type referred to, exact alignment of the frame structure with the vertical and horizontal motions of the carrier is of great importance. It is especially important that the vertical rows of storage openings be in alignment with the vertical motion of the carrier whereby when the carrier is aligned with the lowermost opening of a selected row, it will then be automatically aligned with all of those openings disposed vertically thereabove. It is also important that as much of the frame as possible be prefabricated in a factory under conditions where closely controlled, precision work can be done on the various parts of the frame while at the same time producing a structure which is capable of shipment by ordinary, commercially available means to the site of erection and use of the frame. A further important feature of such a frame is that it be readily adjustable at the time of or after its assembly whereby initial accurate alignment or subsequent adjustments in alignment can be readily made. Such a frame structure must have great strength when assembled, be rigid and durable, and is preferably of such flexible design as to be readily adaptable for large or small installations.

It is the object of this invention to provide a frame structure for a mechanical storage system which incorporates and embodies all of the above referred to features and characteristics in any and every combination thereof.

Further objects of this invention and a number of its advantages will be referred to in or will be evident from the following description and the accompanying drawings, in which said drawings, FIG. 1 is a side elevation of the frame structure of this invention;

Figure 1:
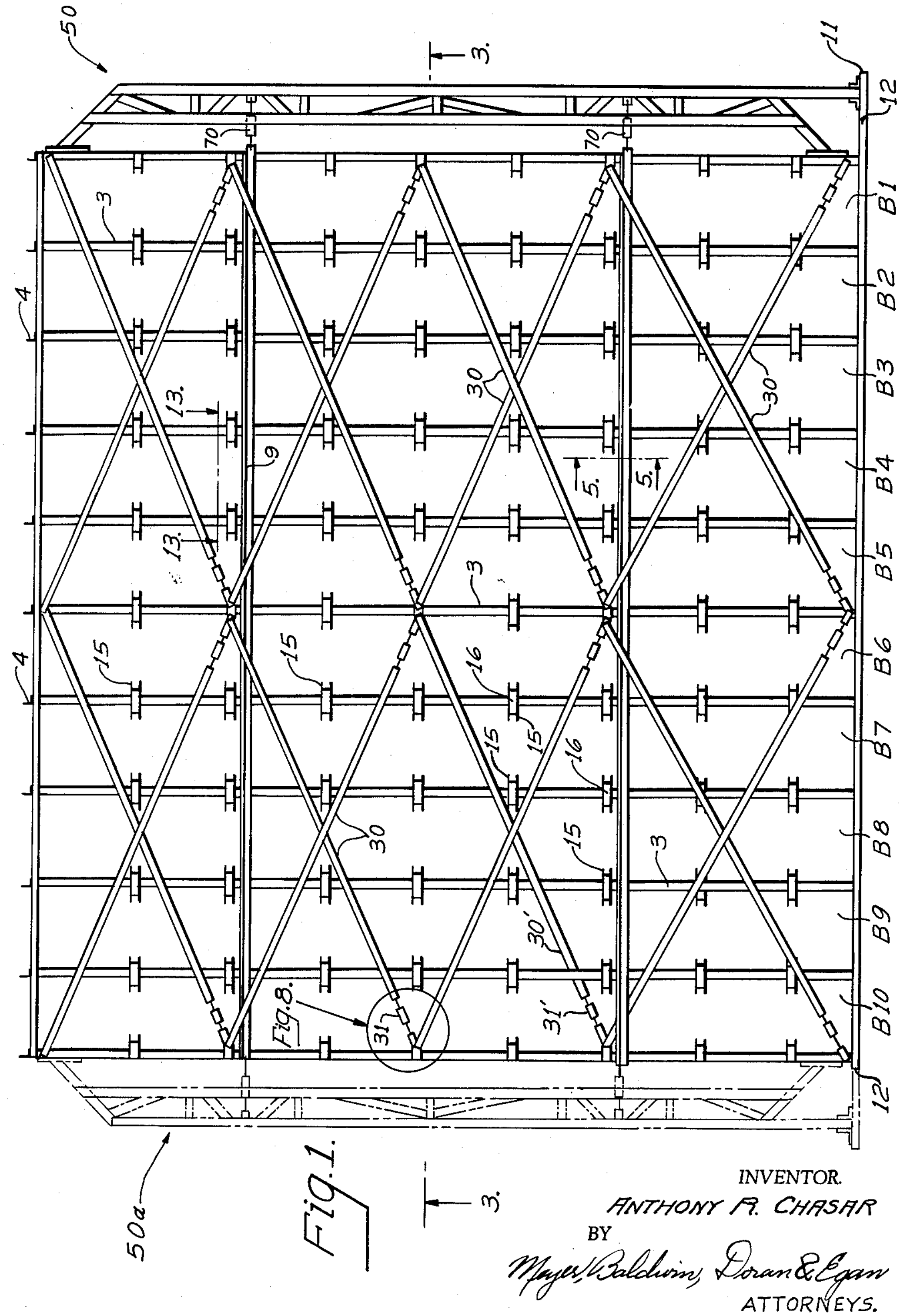
Figure 9A:
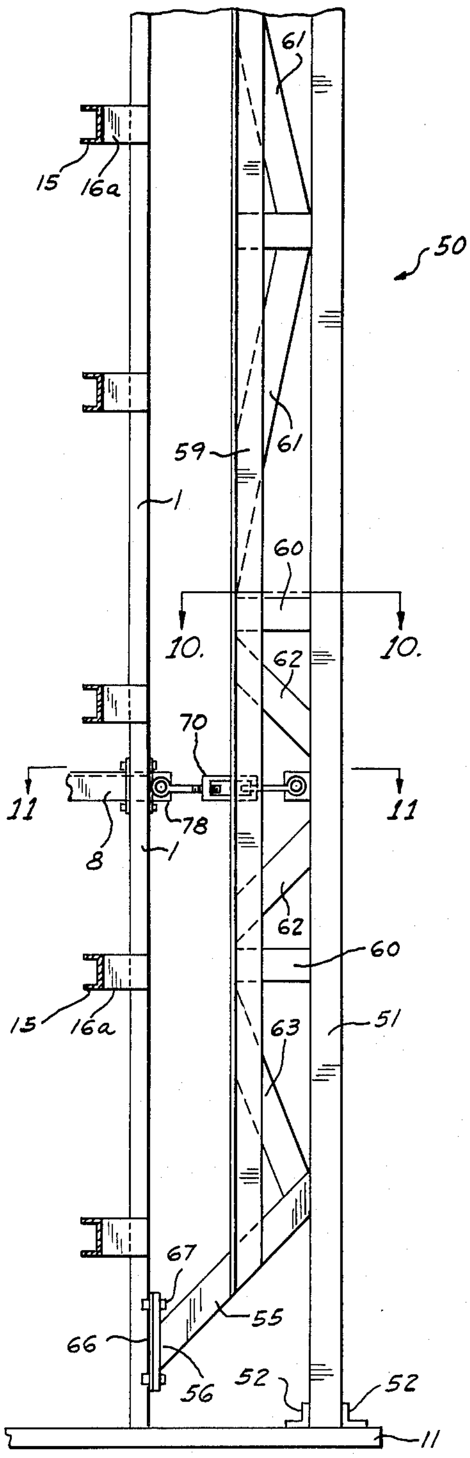
Figure 9B:
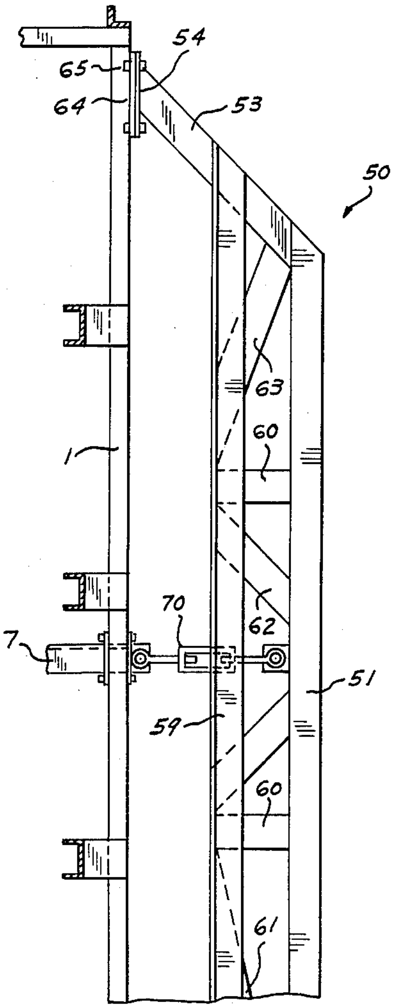
Figure 10:
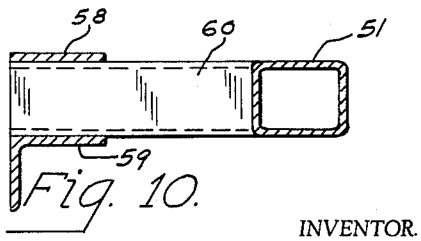
Figure 13:
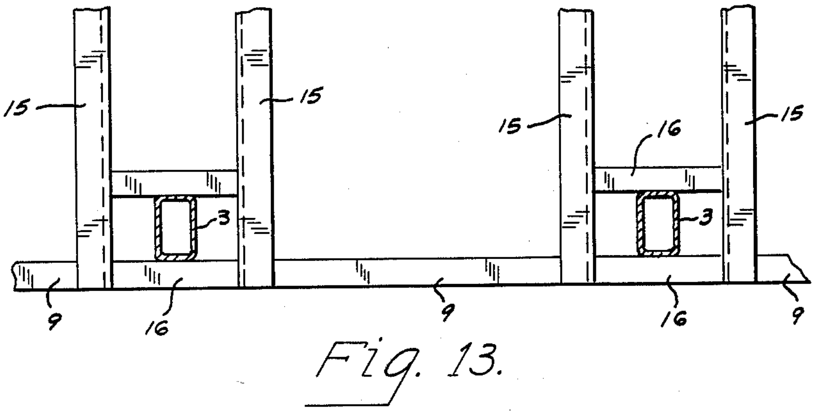
Figures 11, 12, 14:
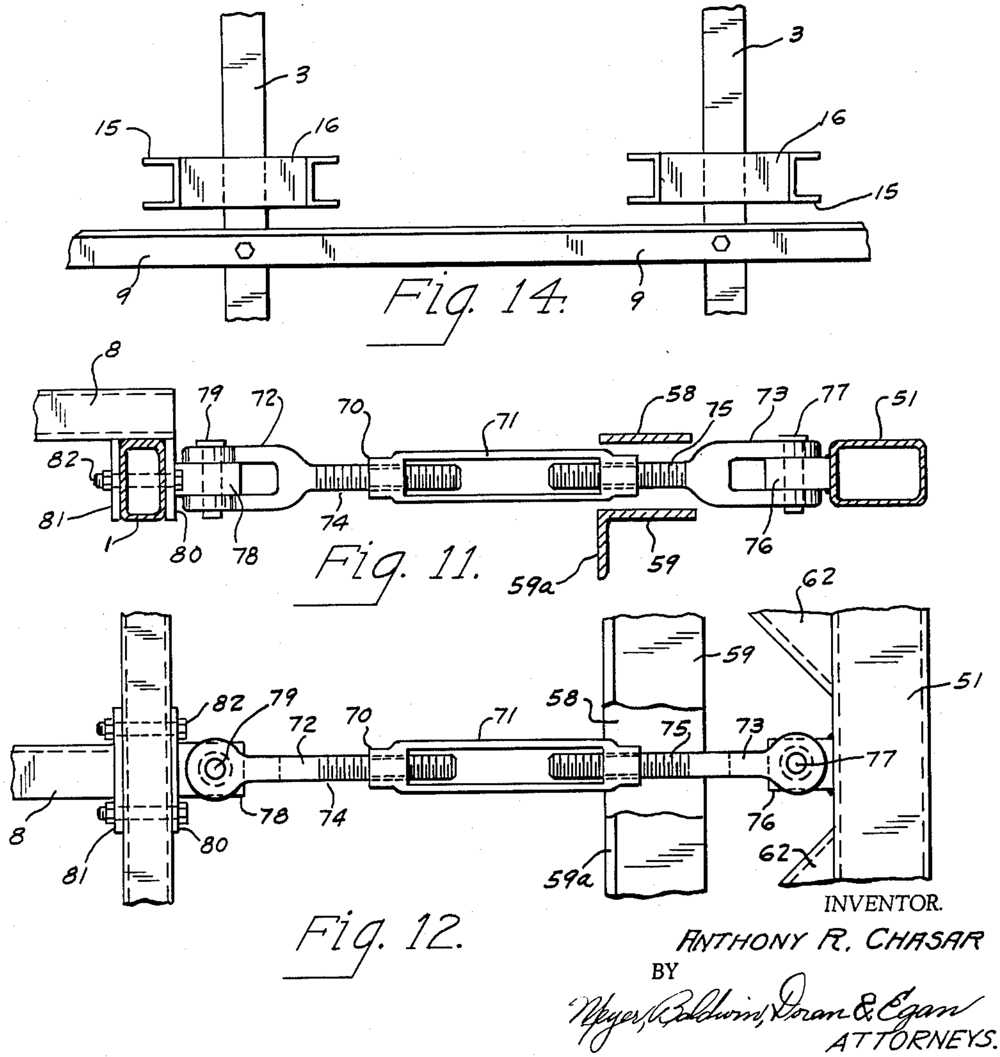
Figure 15:
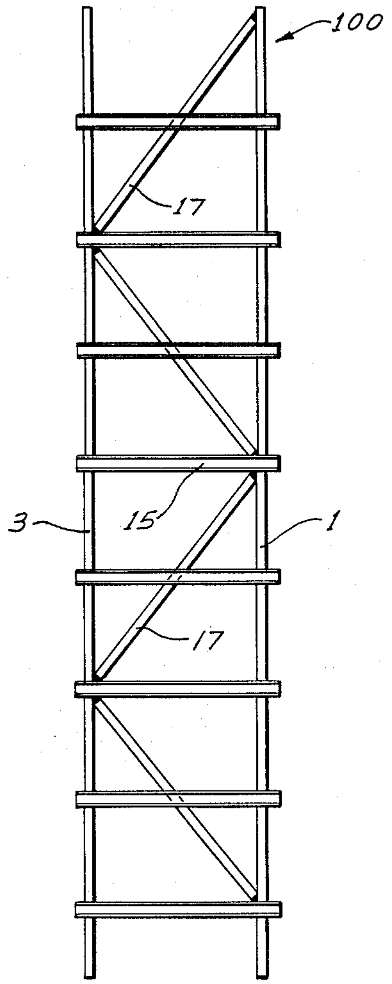
Figure 16:
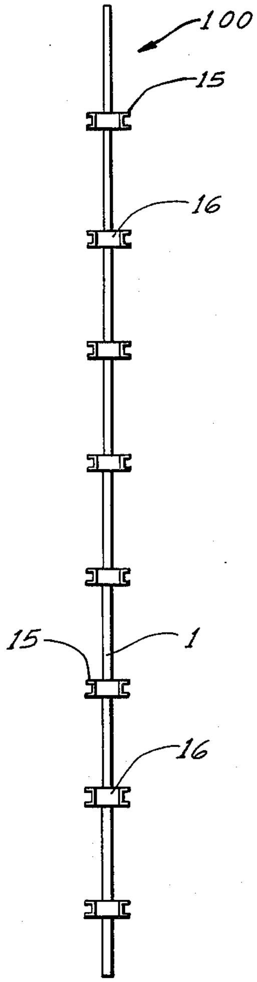
Figure 17:
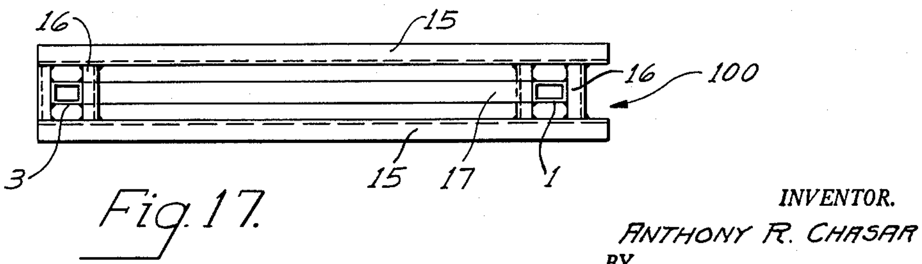
Figure 18:
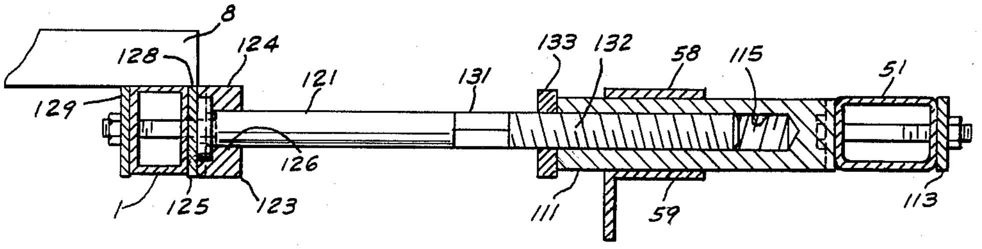
Figure 19:
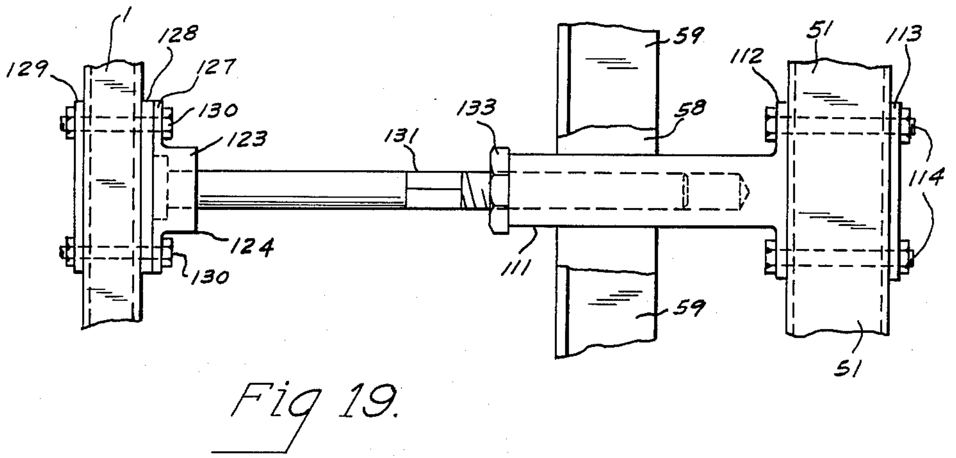

FIGS. 9A and 9B comprise lower and upper portions respectively of a truss, shown in side elevation on an enlarged scale;

FIG. 10 is an enlarged section taken along the line 10—10 of FIG. 9A;

FIG. 11 is an enlarged section taken along the line 11—11 of FIG. 9A showing a turnbuckle of the truss;

FIG. 12 is a side elevation, partially cut away, of the turnbuckle of FIG. 11 showing portions of the truss associated therewith;

FIG. 13 is an enlarged sectional detail of two main posts and associated members taken along the line 13—13 of FIG. 1;

FIG. 14 is a side elevation of the posts and associated members of FIG. 13;

FIG. 15 is a front elevation of a ladder assembly component of the frame structure;

FIG. 16 is a side elevation of the component of FIG. 15;

FIG. 17 is an enlarged top plan view of the component of FIGS. 15 and 16;

FIG. 18 is a view similar to FIG. 11 showing an alternative adjusting means for the truss; and FIG. 19 is a view similar to FIG. 12 of the alternative adjusting means of FIG. 18.

Referring now to FIGS. 1–4 of the drawings, the frame structure of this invention has two parallel rows of vertically disposed, uniformly spaced aisle posts 1–1′ which define an aisle 2 therebetween. The aisle posts 1–1′ are arranged in transversely aligned pairs across the aisle 2, and vertically disposed rear posts 3–3′ respectively are spaced directly outwardly therefrom. All of the posts are of the same height and, as herein illustrated, are made from metal tubing of preferably rectangular cross section.

Each transversely aligned group of posts 1–1′–3–3′ are connected across the upper ends thereof by a top cross tie 4 comprising a steel brace or strut which is preferably L-shaped in section. Each cross tie 4 is secured to the upper ends of the associated aligned posts in any suitable manner.

The upper ends of the rows of aisle posts 1–1′ are longitudinally connected together in the direction of the aisle by top stringers 5–5′ respectively. The upper ends of the rear or outer posts 3–3′ are similarly connected together in the direction of the aisle by outer top stringers 6–6′. Said stringers comprise elongated steel members which are preferably L-shaped in cross section, and said stringers are bolted or otherwise rigidly secured to the respective posts.

Figure 4:
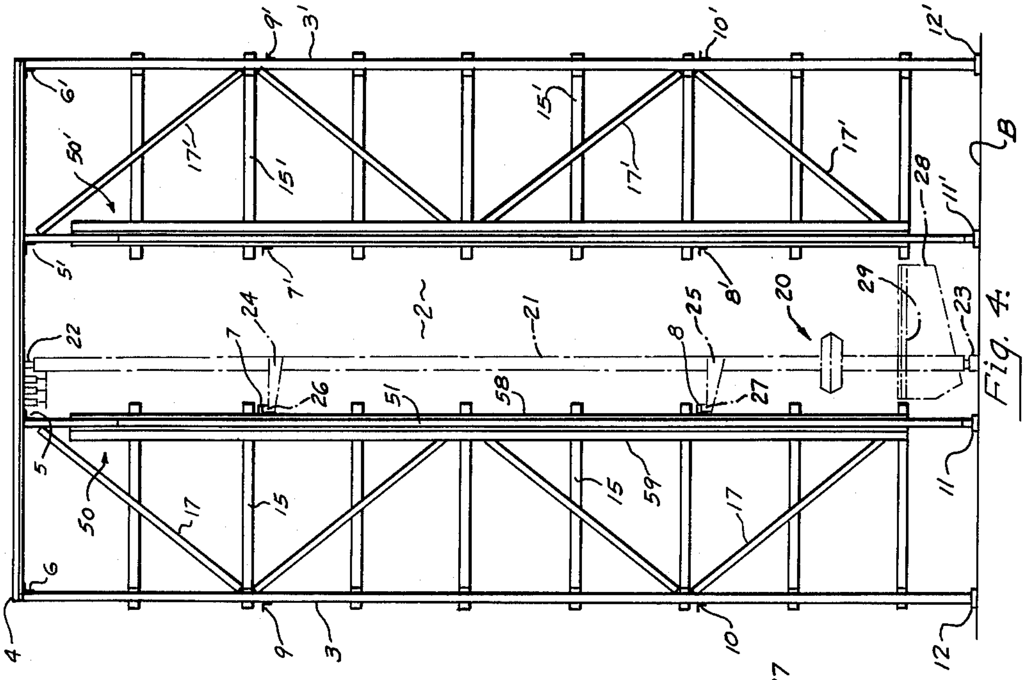
FIG. 4 is a right end elevation of the frame structure as shown in FIG. 1.

As shown in FIG. 4, the top stringers 5–5′ and 6–6′ are connected to the inner or aisle sides of the respective posts 1–1′ and 3–3′. Intermediate the tops and bottoms of the aisle posts there are provided, on the aisle sides thereof, vertically spaced intermediate stringers 7–7′ and 8–8′. Similarly, intermediate the tops and bottoms of the outer or rear posts there are provided, on the outer sides thereof, vertically spaced intermediate stringers 9–9′ and 10–10′. All of the intermediate stringers are elongated steel members with the stringers 7′, 8′, 9–9′ and 10–10′ being L-shaped in cross section, as herein illustrated. The intermediate stringers 7 and 8 are channel shaped in section with the open sides of the channels directed downwardly for a purpose to be hereinafter fully discussed.

The entire frame structure rests upon four elongated, flat, steel base stringers 11–11' and 12–12'. The aisle posts 1 are supported by the base stringer 11, the aisle posts 1' are supported by the base stringer 11', the outer posts 3 are supported by the base stringer 12, and the outer posts 3' are supported by the base stringer 12'. All of the base stringers are solidly mounted in any suitable manner upon a floor or other suitable base surface as indicated at B in FIG. 4.

Each pair of transversely aligned posts 1–3 or 1'–3' carries a plurality of transversely directed, horizontally disposed load channels 15 or 15' respectively. The load channels are mounted on either side of the aligned pairs of posts as viewed in FIG. 1 by load channel support braces 16 or 16'. Said support braces are disposed parallel with the aisle 2 and are welded or otherwise suitably secured on either transverse side of each post in such manner as to project a short distance beyond the associated post in a direction parallel with the aisle. The load channels 15–15' are mounted with their web portions against the ends of the associated support braces 16–16' and are preferably welded in place. This arrangement provides a multiplicity of pairs of load channels 15 disposed at different levels between adjacent posts along the aisle with said load channels opening toward each other. A similar load channel arrangement is provided on the opposite side of the aisle by pairs of load channels 15' which are respectively transversely aligned with the pairs of load channels 15.

Referring now to FIGS. 4 and 15, each transversely adjacent pair of posts 1–3 or 1'–3' are further rigidly connected together by a plurality of diagonal reinforcing braces 17–17' respectively. Said braces are preferably tubular steel members which are welded at their ends to an aisle post and a rear post respectively.

Figure 3:
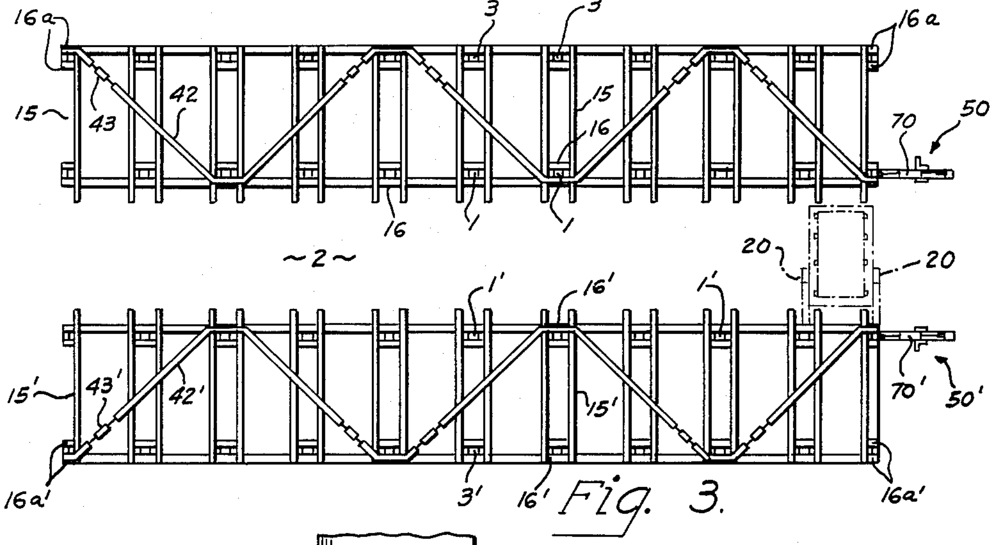
FIG. 3 is a horizontal section of the frame structure taken along the line 3—3 of FIG. 1, drawn to the scale of FIG. 2.

Referring to FIGS. 1 and 3, it will be noted that those pairs of posts 1–3 and 1'–3' which are disposed adjacent to the ends of the aisle 2 have load channels 15–15' disposed only on one side thereof, that is, inwardly of the frame structure. These end load channels are connected to the end posts by relatively shorter load channel braces **16*a* and 16*a'*** which are welded flatwise to their associated posts and project only inwardly of the frame structure.

The foregoing describes the basic frame structure which is adapted for use in a mechanical storage system. In use of the frame structure, a carrier, generally indicated at 20 by broken line in FIG. 4, is disposed for movement along and within the aisle 2. Said carrier comprises a pair of vertically disposed masts 21 spaced from each other in the direction of the aisle 2. These masts afford a horizontally movable frame which moves along the aisle on overhead and base rails 22 and 23 respectively. The masts 21 carry transversely projecting, vertically spaced arms 24 and 25 having rollers 26 and 27 mounted to the ends thereof. The rollers 26 and 27 are mounted on top of the arms on vertical axes and fit upwardly into the channel shaped intermediate stringers 7 and 8 of the frame structure. Said rollers roll within their respective channel stringers as the masts move horizontally along the aisle 2; and said masts and the carrier in general are maintained by the arms 24 and 25 in a desired alignment with the frame structure.

The carrier 20 has a vertically movable frame 28 adapted to move up and down the masts 21 between the different levels of the load channels 15–15'. Said vertically movable frame in turn carries a laterally movable extractor 29 which is movable transversely out of the aisle in-between and partially within a pair of the load channels 15 or 15'. Said extractor is preferably provided with roller means along two side edges for engaging the disposed load channels, and additional means for depositing a load upon and bridging it across the upper surfaces of said pair of load channels. The details of the carrier mechanism are not herein disclosed since the carrier forms no part of the present invention, a full disclosure of one typical form thereof being disclosed in the aforementioned copending patent application.

In adapting a storage frame structure to a carrier of the type briefly described above, the problem of effecting and maintaining proper alignment of the frame becomes highly critical. The larger the frame structure is, particularly in height, the more difficult the problem is to overcome. The vertically movable frame 28 and the load carrying extractor 29 travel vertically upon the masts 21. If the vertical posts 1–1' and 3–3' of the frame structure are not parallel with the masts 21, said extractor will be carried progressively out of alignment with the pairs of load channels as it moves vertically upwardly even though said extractor may be presently aligned with the lowermost load channel. In very high storage frame structures, long vertical members such as the aisle and rear posts or the masts 21 inevitably tend to bow and/or lean out of exact vertical alignment. The frame structure of the present invention is provided with means for systematically and progressively bringing the frame structure into alignment with the carrier motions and for maintaining and subsequently adjusting such alignment. Since the carrier 20 must be able to move freely both vertically and horizontally within the aisle 2, and since the extractor 29 carrying a load thereon must be free to move laterally into and above the load channels, all bracing and adjusting means are arranged in such manner as to leave these areas free and clear.

Referring now particularly to FIG. 1, it will be noted that the load channels 15 or 15' are vertically evenly spaced along the vertical posts and are disposed at eight different levels, with the frame extending upwardly above the eighth or top level a sufficient distance to accommodate a relatively high load bridged across any pair of the uppermost load channels. It will also be noted that there are 10 vertical rows of load supporting means hereinafter referred to as bays and designated respectively for purposes of identification as B1 through B10. The first or bottom level of load channels 15 or 15' is disposed a substantial distance above the base stringers 11–11' or 12–12' in such manner that the upper, extractor carrying portion of the vertically movable frame 28 can be positioned generally at the level of said bottom row of load channels when said extractor is moving a load onto or off of a cooperating pair thereof.

The outer sides of the frame structure at the rear posts 3–3' are braced by a plurality of diagonally disposed longitudinally adjustable metal straps or bars 30–30' respectively. The ends of these straps are connected by bolts or other suitable means to either the outermost load channel support braces 16–16' or the outer posts themselves. The straps 30–30' are arranged in crossed pairs in such manner as to exert a substantial pull upon the peripheral members of the frame in both vertical and horizontal directions. In the form of the invention herein illustrated, the straps are arranged in symetrically crossed pairs with each strap of each pair diagonally crossing five bays and approximately two complete load levels. Each of the straps is anchored at the central outer post 3 or 3' between the bays B5 and B6 at one end thereof and to one of the outer posts at the end of the aisle at the opposite end thereof. It will be understood that in a frame structure having a greater number of load levels or an increased number of bays, the diagonal arrangement of the straps may be varied slightly, but the same basic arrangement would preferably be maintained.

Figure 8:
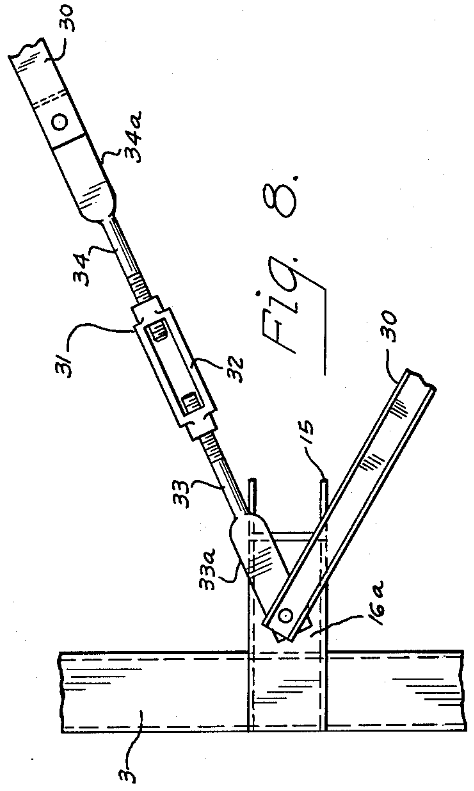
FIG. 8 is an enlarged showing of the portion encircled in FIG. 1.

Means for adjusting the tension on the straps 30 or 30' are provided in the form of turnbuckles 31–31' respectively, one of which is detailed in FIG. 8. Said detailed turnbuckle comprises a right- and left-hand screw link 32 having rods 33 and 34 thread fitted therein. The rods 33 and 34 have flattened, blade-like distal end portions **33*a* and 34*a* respectively by means of which the turnbuckle is bolted or otherwise suitably secured at one end thereof to the frame structure and at the other end thereof to a strap 30 or 30'. The opposite end of each associated strap is, of course, bolted or otherwise suitably secured to the frame structure at a remote point as above described. Rotation of the link 32 adjusts the tension on the associated strap 30** whereby a diagonal pulling force is effected at the periphery or edge of the frame structure.

Figure 2:
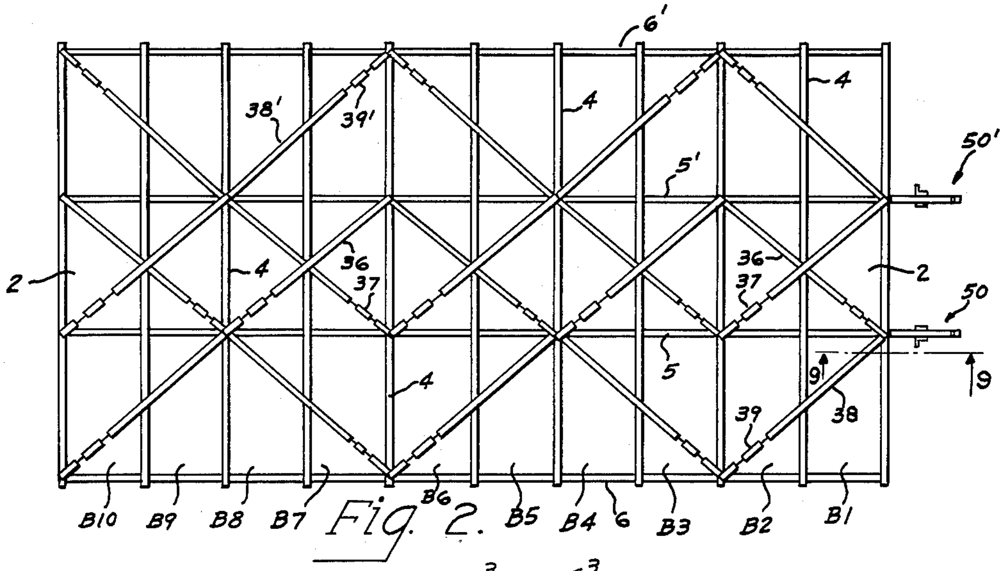
FIG. 2 is a top plan view of the frame structure shown on a smaller scale.

As shown in FIG. 2, the top of the frame structure is braced in a horizontal plane by a plurality of diagonal, metal straps 36 and 38–38' each having at one end thereof a turnbuckle 37 or 39–39' respectively. The straps 36 are arranged diagonally across the top of the aisle 2 in crossed pairs, each pair embracing two of the bays. For example, a first crossed pair of the straps 36 embraces bays B1 and B2 across the aisle, a second pair similarly embraces the bays B3 and B4, a third pair embraces the bays B5 and B6, a fourth pair embraces the bays B7 and B8, and a fifth pair embraces the bays B9 and B10.

The straps 38 and 38' are arranged in zig-zag fashion across the top of the storage areas on either side of the aisle, each strap extending diagonally outwardly from just above an aisle post to a rear post and crossing over two of the bays. The top horizontal bracing is connected or anchored to the frame structure just above the top cross ties 4 in any suitable manner such as by bolts or the like. By means of the various turnbuckles 37 and 39–39', the top of the frame structure can be squared and maintained in suitable alignment with the carrier 20.

Because the aisle 2 of the storage frame at the aisle posts 1–1' must remain open to allow movement of the extractor in-between the pairs of load channels 15 or 15', the side bracing of FIG. 1 which is applied to the rear or outer posts cannot be applied to the aisle posts. Also, because the vertically movable frame 28 of the carrier must be free to move vertically between the top and bottom of the frame structure to reach the different storage levels, the horizontal bracing of FIG. 2 can only be applied across the top of the frame since the crossed straps 36, if disposed at any other level, would interfere with the vertical motion of the carrier. Nevertheless, straightening and aligning of the frame structure at its outer sides and across the top, although adequate for bringing the rear posts 3—3' into proper alignment with the carrier, would not necessarily assure that the aisle posts 1–1' will also be properly aligned. Proper alignment of the aisle posts is even more critical than alignment of the outer posts, and additional means is provided for effecting this alignment.

One of the means for effecting alignment of the aisle posts is the intermediate, horizontal bracing illustrated in FIG. 3. As shown on FIG. 1, FIG. 3 is a horizontal section through the frame taken just below the fifth level looking upwardly. The bracing comprises metal straps 42–42' and turnbuckles 43–43' which are connected diagonally on a horizontal plane across two bays from an aisle post 1–1' to a rear post 3–3' disposed on the same side of the aisle. Assuming that the outer sides of the frame structure at the rear posts 3–3' have been properly straightened, adjustment of the turnbuckles 43–43' effect a longitudinal pull on certain of the aisle posts 1–1' intermediate the ends of said posts. Since all of these aisle posts are connected or bolted together by the longitudinally directed stringers 5–5', 7–7' and 8–8', all of said aisle posts are thereby adjusted to a position of proper alignment with the carrier motions. Such intermediate horizontal bracing is particularly essential in extremely high structures and may be provided at any level. The straps 42–42' are positioned closely beneath one of the load levels thereby in no way interfering with either the extractor movement into the load channels at that level or with a load positioned at the load level immediately therebeneath.

Other means for straightening and maintaining the alignment of the aisle posts 1–1' is illustrated in FIG. 1 and is further detailed in FIGS. 9A–12. This second means comprises a pair of trusses generally indicated at 50–50' (FIG. 4) which are mounted to the frame structure at at least one end of the aisle 2 in alignment with the parallel rows of aisle posts 1–1' respectively. The trusses 50–50' are substantially similar in construction, being mirror images of each other. Therefore, only the truss 50 is shown and described in detail, it being understood that the truss 50' has corresponding parts arranged in mirror image with the truss 50.

The truss 50 comprises a vertically disposed main beam 51 which is anchored at the lower end thereof to the base stringer 11 by any suitable means such as angled brackets 52. The main beam 51 is spaced away from the adjacent, end aisle post 1 and is parallel therewith. Said main beam is preferably made of heavy, steel tubing or rectangular section and carries at the upper end thereof an obliquely upwardly directed end strut 53 having a vertically disposed mounting base 54 welded or otherwise suitably secured to the distal end thereof. Adjacent to the lower end of the main beam 51 there is provided a downwardly, obliquely directed lower end strut 55 carrying a vertically disposed mounting base 56 at its distal end.

The end struts 53 and 55 are further connected to each other by a flat steel bar 58 which is welded or otherwise suitably secured to said struts on the aisle side thereof and an L-shaped beam 59 which is suitably secured at the ends thereof on the opposite side of said struts. As shown in FIG. 11, a flange **59*a* of the L-shaped beam 59 projects outwardly from the truss and the aisle thereby affording a clear space between the bar 58 and the base of said L-shaped beam 59. The bar 58 and the L-shaped beam 59 are disposed laterally opposite each other in spaced relation to and parallel with the main beam 51**.

In the form of the invention as herein illustrated, the main beam 51 is connected to the bar 58 and the L-shaped beam 59 by five, horizontally disposed struts 60 preferably made of rectangular tubing of the same size as the main beam and projecting from the main beam in-between the bar 58 and the beam 59. The horizontal struts 60 are rigidly secured in place in any suitable manner such as by welding at one end thereof to the main beam 51 and at the sides thereof adjacent to the other end to the bar 58 and the L-shaped beam 59. Between said horizontal struts there are provided alternately diagonal struts 61 and 62, and between the uppermost and lowermost of said horizontal struts and the adjacent end struts 53 and 55 there are provided additional diagonal struts 63. All of the diagonal struts are also preferably made of rectangular steel tubing welded at one end thereof to the main beam 51, a horizontal strut 60, or an end strut 53 or 55 and at the other end thereof to the bar 58 and the L-shaped beam 59. The resultant construction provides a strong, rigid truss which is virtually inflexible in a horizontal direction parallel with the aisle 2 or the row of aisle posts 1.

Adjacent to the upper and lowermost ends of the end aisle post 1 there are provided mounting plates 64 and 66 respectively. Said mounting plates are welded or otherwise rigidly secured to said aisle post 1 and extend beyond the sides of said posts in either transverse direction. The mounting bases 54 and 56 are substantially the same size as said mounting plates and are so positioned as to be disposed flatwise thereagainst. The mounting bases and the mounting plates are suitably secured together by bolt and nut assemblies 65 and 67 whereby the adjacent first aisle post 1 is disposed across the ends of the truss 50.

Intermediate the ends of the truss 50 or 50' at the levels of and in horizontal alignment with the stringers 7 or 7' and 8 or 8' there are provided a pair of turnbuckles 70 or 70' respectively which are connected at one end to the adjacent aisle post 1 or 1' and at the other end to the associated main beam. The turnbuckles associated with the stringers 7–7′ and 8–8′ are identical in structure and function, and only one of them will, therefore, be described in detail. It will be understood that the description of one of them applies equally to all of them.

A turnbuckle 70 is shown in detail in FIGS. 11 and 12. It comprises a right- and left-hand screw link 71 and a pair of oppositely directed clevises 72 and 73 having oppositely threaded shanks 74 and 75 respectively integral therewith and engaging opposite ends of said screw link. The main beam 51 carries a heavy lug 76 welded or otherwise suitably secured thereto disposed between the arms of the clevis 73. A heavy pin 77 is disposed through suitable apertures in the clevis 73 and the lug 76 whereby said clevis is secured to the main beam 51. The arms of the clevis 72 similarly embrace a lug 78 which has an enlarged mounting base 80 welded or otherwise rigidly secured thereto. The mounting base 80 is disposed flatwise against a flat side of the post 1, and a backup plate 81 is disposed flatwise against the opposite side of said aisle post. Bolt and nut assemblies 82 project through suitable aligned apertures in the mounting base 80, the aisle post 1, and the backup plate 81 whereby the lug 78 is rigidly secured to said first aisle post. A heavy pin 79 is disposed through suitable aligned apertures in the clevis 72 and the lug 78 whereby the other end of the turnbuckle 70 is secured to the aisle post 1. Said turnbuckle projects between the bar 58 and the L-shaped beam 59, the spacing between these latter members affording adequate room for passage of the turnbbuckle therethrough with substantial clearance on either side thereof.

By adjustment of the turnbuckles 70 (or 70′), the first or immediately adjacent aisle post 1 (or 1′) can be pulled in the direction of the aisle 2 to bring it into alignment with the vertical motion of the carrier 20. The adjusting pull is directly along the level of the aisle stringers 7 and 8 which, as hereinbefore pointed out, are rigidly connected at uniformly spaced intervals to all of said aisle posts. The result is that when the first aisle post is adjusted to a given alignment, all of the other aisle posts in that row automatically assume the same alignment.

The trusses 50 and 50′ are, of course, applied to that end of the frame structure toward which it is desired to pull the aisle posts for the purpose of straightening or aligning said posts with the carrier movements. It is anticipated that in some installations it is desirable to have trusses at both ends of the frame structure as shown in FIG. 1 wherein a second truss at the left-hand end of the frame structure is indicated at 50*a* in broken line. With this arrangement, the aisle posts are adjustable in either direction parallel with the aisle and are rigidly held in adjustment by one truss working against the other.

The base stringers 11—11′ and 12—12′ are preferably initially mounted upon the base surface B as perfectly level as possible. However, minor undulations in the base surface or in the base stringers may be present due to settling of the surface or other unpredictable causes. This makes it important that the load levels defined by the pairs of load channels 15 or 15′ be vertically adjustable so that when the vertically movable frame 28 and its associated extractor 29 have been leveled in alignment with load channels on one side of the aisle 2, said extractor will be equally well aligned with the load channels which are disposed directly across the aisle from the first mentioned load channels. Also, since any cooperating pair of load channels 15 or 15′ are mounted to separate post means, it is important that the separate post means be separately vertically adjustable whereby said cooperating pair of load channels are so oppositely disposed as to allow a smooth entry of the extractor therein.

Figure 7:
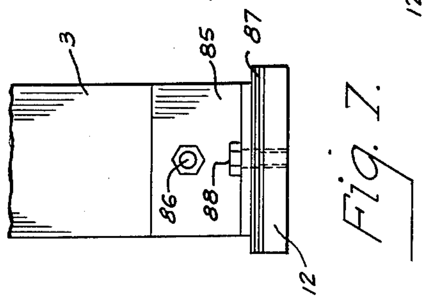
FIG. 7 is an elevation of the base portion of FIG. 6, rotated ninety degrees.
Figure 6:
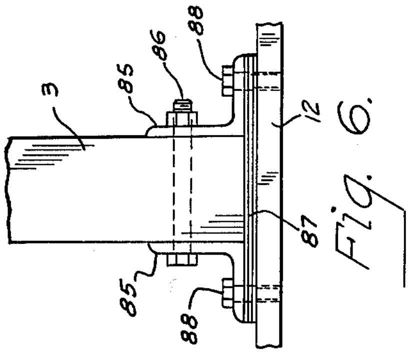
FIG. 6 is an enlarged elevation of the base portion of a main supporting post.

The means for individually vertically adjusting any of the posts 1–1′ or 3–3′ is illustrated in FIGS. 6 and 7. Since the means is identical for all of the posts, only one is herein shown and described in detail. FIG. 6 shows the bottom portion of an outer or rear post 3 mounted upon the base stringer 12. A pair of angle brackets 85 are secured to opposite sides of the post 3 by a bolt and nut assembly 86 which projects through suitable aligned apertures in the post 3 and in vertically disposed flanges of the angle brackets 85. The bottom end of the post 3 and the bottom surfaces of the horizontal flanges of the angle brackets 85 are coplanar and effect a flat, continuing surface at the bottom of the post. Between the bottom of the post and the upper surface of the base stringer 12 there are provided a plurality of thin, sheet metal shims 87 used for vertically adjusting the posts 3. It will be understood that these shims would be optionally used as dictated by the need for vertical adjustment and might be used in either greater or lesser number than herein illustrated. Bolts 88 project downwardly through suitable aligned apertures in the horizontal flanges of the angle brackets and the shims 87 and are threaded at their lower ends into the base stringer 12. Thus, when the proper amount of shimming has been determined and applied, the entire assembly of post, brackets, shims, and base stringer is rigidly secured together by the bolt and nut assembly 86 and the bolts 88.

Figure 5:
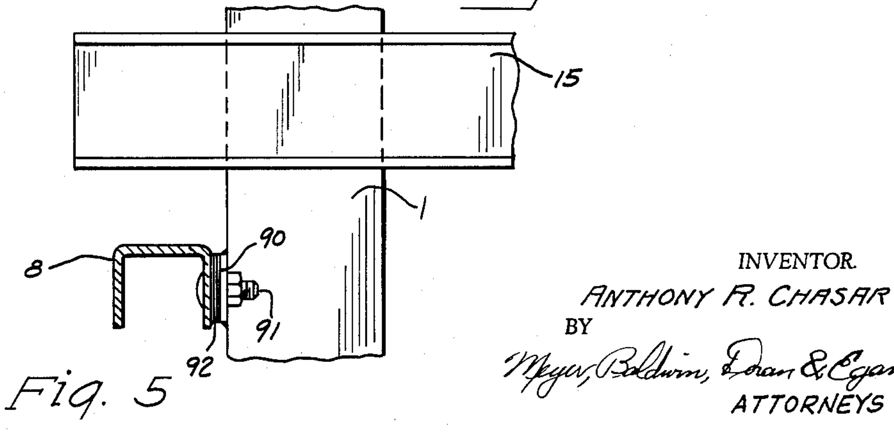
FIG. 5 is an enlarged sectional detail taken along the line 5—5 of FIG. 1.

The intermediate stringers 7 and 8, which are channel shaped to receive the rollers 26 and 27, are adapted to keep the masts from deflecting under eccentric loading as loads are transferred laterally by the extractor 29. They also serve to keep the masts so aligned that the vertical frame 28 of the carrier is maintained square with the aisle and with the open inner faces of the storage areas along the aisle. To carry out these purposes, it is desirable that the stringers 7 and 8 be transversely adjustable a small amount relative to the aisle 2. Means for making these minute adjustments of a stringer 7 or 8 is illustrated in FIG. 5 and is identical at each post. Therefore, only one such attachment means is herein described and illustrated in detail.

Each aisle post 1 carries a mounting plate 90 (for each stringer 7 and 8) which projects beyond the associated post in either direction parallel with the aisle 2. Said mounting plate is preferably a heavy, flat steel member which is welded or otherwise suitably secured to the post. The channel shaped stringer 8 (or 7 as the case may be) is secured to the post 1 by bolt and nut assemblies 91 which project through suitable aligned apertures in one flange of the stringer and the mounting plate 90. Transverse adjustment is effected by interposing shims 92 wherever necessary between the stringer 8 and the mounting plate 90, said shims being also suitably apertured to receive the nut and bolt assemblies 91. Thus, minor adjustments of the guide stringers are easily effected where needed at each aisle post 1.

The frame structure of the present invention is adapted to be substantially prefabricated in its parts in a suitable factory for subsequent assembly at a remote construction site. This makes it possible to obtain factory precision in the manufacture of the various parts which would be extremely difficult if not impossible to attain at the construction site. For example, the drilling of the bolt apertures in the longitudinally disposed stringer members, which apertures determine the critical longitudinal spacing of the posts, can be done in a factory by the use of a suitable jig with the most exacting precision. However, the size of the completed frame structure makes it totally impractical to construct the entire frame before shipment. It is, therefore, preferred that as much of the frame as possible be built at the factory and that the frame be so constructed that final critical adjustments can be made at the construction site.

To insure the basic squareness of the frame under conditions where factory precision methods can be utilized, it is preferred that pairs of posts comprising an aisle post 1 (or 1′) and a rear post 3 (or 3′) be assembled with their associated load channels 15 (or 15′), load channel support braces 16 (or 16′), and diagonal braces 17 (or 17′) at the factory prior to shipment to the construction site. One such assembly, hereinafter referred to as a ladder assembly and generally indicated at 100, is detailed in FIGS. 15–17. The ladder assembly 100 is typical of a plurality of such ladder assemblies the parts of which are preferably welded together to form a strong unit construction. The spacing between the aisle post 1 and the rear post 3 determines the length of load to be stored, and the vertical spacing between the load channel 15 determines the height of the load which can be stored in the frame. It is, of course, important that the load channels be perpendicular to the posts and that the spacings of both the posts and the load channels be uniform in every ladder assembly used for the construction of a given frame. This can be effected with precision by suitable jig and measuring devices within the factory to a degree not attainable in the field. The diagonal bracing is also welded at the factory and is particularly important on very high structures to afford transverse stiffness to the frame structure.

The resulting ladder assembly 100 is extremely rigid in a plane transverse to the aisle of the frame structure due to the multiplicity of moment connections between the load channel and their supports and the diagonal bracing at the posts. These ladders are, however, slightly flexible in a direction parallel with the aisle 2 which makes it possible to subsequently square the entire structure in that direction. The shims 87 (FIGS. 6 and 7) under the aisle and rear posts serve to keep the ladder assemblies vertical in a transverse plane and parallel with corresponding ladder assemblies across the aisle. By welding the load channels to the posts at the factory, subsequent squaring and aligning of the frame structure automatically disposes these load channels in their proper positions.

FIGS. 18 and 19 show an alternative adjusting means for use in place of the turnbuckles 70–70′ of the trusses 50–50′. Said alternative adjusting means comprises a jacklike appliance 110 connected between an end aisle post 1 and the main beam 51 of the truss 50. Said appliance is disposed axially parallel with the aisle 2 and is adapted to adjust the aisle post 1 in either longitudinal direction along said aisle.

The appliance 110 has a socket member 111 carried by the main beam 51 and a rotatable shaft 121 carried by the aisle post 1. Said socket member projects outwardly from the main beam 51 between the bar 58 and the L-shaped beam 59 and is provided with a flanged base 112 which is disposed flatwise against the main beam 51. A backup plate 113 is disposed on the opposite side of said beam, and said base, beam, and backup plate are rigidly secured together by suitable bolt and nut assemblies 114.

The shaft 121 has a circular, enlarged head 122 by means of which it is rotatably mounted within a retainer 123. Said retainer comprises a boss 124 having a circular recess 125 in the bottom thereof and an aperture 126 coaxial with and of smaller diameter than said recess. The bottom of the recess thus provides an annular shoulder **125*a* internally of said retainer. The shaft 121 projects through the aperture 126 with the head 122 disposed in the recess 125 and against the internal shoulder 125*a*. The bottom of the retainer 123 has a flanged base 127 which is disposed flatwise against a bearing plate 128 which covers the recess 125. The bearing plate 128 is disposed flatwise against the post 1, and a backup plate 129 is disposed on the opposite side of said post. Said base, bearing plate, post, and backup plate are rigidly secured together by bolt and nut assemblies 130**.

The recess 125 and the head 122 are of such relative dimensions that the head rotates within said recess but said shaft is retained against longitudinal movement by the shoulder **125*a* and the bearing plate 128. Outwardly from the retainer 123 said shaft has a preferably rectangular gripping portion 131 and outwardly therefrom a threaded portion 132. Said threaded portion is disposed within an internally threaded socket 115 of the socket member 111, and a lock nut 133 is disposed on the threaded portion 132 adjacent to the distal end of the socket member 111**.

By means of a wrench or other suitable tool applied to the gripping portion 131, the shaft 121 can be rotated to move inwardly or outwardly of the socket 115. Outward movement of the shaft exerts a pressure against the post 1 to move it in one longitudinal direction relative to the aisle and movement of said shaft inwardly of the socket effects a pulling movement against said post to move it in the opposite direction. Thus by using the alternative, jacklike applicance 110, the aisle posts can be adjusted in either direction along the aisle relative to a single truss. The lock nut 133 is used to secure the appliance in any selected adjusted position.

The primary object of the precision aligning of the frame structure of this invention is to obtain smooth, accurate entries of the extractor into the pairs of oppositely disposed load channels as hereinbefore described. Therefore, it is desirable that the posts 1–1′ and 3–3′ be exactly vertical and straight only to the extent that the vertically movable frame 28 moves upwardly in a vertical, straight line, which movement in the exemplary carrier herein disclosed is determined by the vertically disposed masts 21. The carrier motion is maintained vertical in a transverse plane by the proper positioning of the rails 22 and 23 and the stabilizing effect of the roller equipped arms 24 and 25 guided by the adjustable channel shaped stringers 7 and 8. Alignment of the ladder assemblies 100 with the vertical motion of the carrier in a direction parallel with the aisle 2 is effected by the side, top, and intermediate adjustable bracing and the trusses 50–50′. The aisle posts can be adjusted only a limited amount by the intermediate horizontal bracing of FIG. 3 without building up internal, lateral forces within the structure which may otherwise adversely affect its alignment. The trusses 50–50′ provide added means whereby the aisle posts can be forced into proper alignment without this undesirable building up of internal lateral forces within the frame structure.

In assembling the frame structure of this invention, the base stringers 11–11′ and 12–12′ are first mounted securely and as level as possible upon a base surface. The ladder assemblies 100 are then placed in upright rows along the base stringers with their upper ends connected to each other transversely across the aisle 2 by the top cross ties 4 and connected longitudinally to each other by the stringers 5–10 and 5′–10′. The diagonal straps 30 and their associated turnbuckles 31 are preferably used first to square the sides of the frame structure and bring the outside posts into vertical alignment. The top of the frame is then squared by adjusting the straps and turnbuckles 36–37, 38–39, and 38′–39′. The trusses 50–50′ are then used to force the aisle posts into alignment with the carrier masts or the vertical motion of the carrier. The trusses are used to get the basic adjustment necessary, and small, final adjustments are effected by use of the straps and turnbuckles 42–43 and 42′–32′ of the horizontal intermediate bracing of FIG. 3. Shims 87 are placed where needed to adjust the height of individual posts or ladder assemblies, and shims 92 are used where necessary to adjust the intermediate stringer guide channels into alignment with the carrier guide rollers.

It will be understood that many changes in the details of this invention as herein described and illustrated may be made without, however, departing from the spirit thereof or the scope of the appended claims.

What is claimed is:

1. A frame structure comprising two parallel rows of substantially vertical, spaced aisle posts defining an aisle extending longitudinally therebetween and a plurality of laterally open bays on either side of said aisle; parallel rows of substantially vertical outer posts spaced outwardly respectively from said aisle posts; means connecting said parallel rows of posts in a longitudinal direction parallel with said aisle and means connecting said posts laterally across said aisle parallel with said bays; laterally disposed load carrying members mounted to said posts, each load carrying member being connected adjacent to one end thereof to an aisle post and adjacent to the other end thereof to a laterally aligned outer post on the same side of said aisle; adjustable bracing means disposed on the sides and across the top of said frame structure for squaring said sides and top; and means for simultaneously adjusting the vertical straightness of said aisle posts at a level intermediate their upper and lower ends.

2. A frame structure comprising two parallel rows of substantially vertical, spaced aisle posts defining an aisle extending therebetween and a plurality of laterally open bays on either side of said aisle; parallel rows of substantially vertical outer posts spaced outwardly respectively from said aisle posts; means connecting said parallel rows of posts in a longitudinal direction and means connecting said posts laterally across said aisle parallel with said bays; laterally disposed load carrying members mounted to said posts, each load carrying member being connected adjacent to one end thereof to an aisle post and adjacent to the other end thereof to a laterally aligned outer post on the same side of said aisle; a plurality of horizontally disposed, adjustable bracing means connected between some of said aisle posts and certain of said outer posts on the same side of said aisle intermediate the upper and lower ends of said posts; each said bracing means extending diagonally across at least one of said bays.

3. A frame structure comprising two parallel rows of substantially vertical, spaced aisle posts defining an aisle extending therebetween and a plurality of laterally open bays on either side of said aisle; parallel rows of substantially vertical outer posts spaced outwardly respectively from said aisle posts; means connecting said parallel rows of posts in a longitudinal direction and means connecting said posts laterally across said aisle parallel with said bays; laterally disposed load carrying members mounted to said posts, each load carrying member being connected adjacent to one end thereof to an aisle post and adjacent to the other end thereof to a laterally aligned outer post on the same side of said aisle; a truss mounted to an endmost aisle post of each row of said aisle posts; each said truss connected adjacent to the upper and lower ends of its associated aisle post; adjusting means disposed intermediate the ends of each said truss and connected to its associated aisle post for deflecting said aisle post in at least one direction parallel with said aisle; and means connecting all of said aisle posts in each row whereby adjustment of each said endmost aisle post correspondingly adjusts all of the aisle posts in that row.

4. A frame structure comprising two parallel rows of substantially vertical, spaced aisle posts defining an aisle therebetween and a plurality of laterally open bays on either side of said aisle; parallel rows of substantially vertical outer posts spaced outwardly respectively from said aisle posts; each row of posts rigidly mounted at the bottom ends thereof on a substantially level base means; each row of posts connected together at their upper ends by a top stringer; cross ties disposed transversely to said aisle and connecting each laterally aligned group of aisle and outer posts; load support means carried by said posts and defining a plurality of load levels within said bays; and adjustable deflecting means connected to each said row of aisle posts at a level intermediate their upper and lower ends simultaneously deflecting said posts at said level in at least one direction parallel with said aisle in use of said means.

5. A frame structure comprising two parallel rows of substantially vertical, spaced aisle posts defining an aisle therebetween and a plurality of laterally open bays on either side of said aisle; parallel rows of substantially vertical outer posts spaced outwardly respectively from said aisle posts; each row of posts rigidly mounted at the bottom ends thereof on a substantially level base means; each row of posts connected together at their upper ends by a top stringer; cross ties disposed transversely to said aisle and connecting each laterally aligned group of aisle and outer posts; load support means carried by said posts and defining a plurality of load levels within said bays; deflecting means connected to each said row of aisle posts at a level intermediate their upper and lower ends deflecting said posts at said level in at least one direction parallel with said aisle in use of said means; said deflecting means comprising a horizontally disposed, intermediate stringer connected to the medial portions of all of said aisle posts in each said row of aisle posts; a truss mounted to an endmost aisle post of each said row of aisle posts; adjusting means mounted on each said truss and connected to the adjacent aisle post at substantially the level of each said intermediate stringer whereby to move the medial portions of said aisle posts in at least one direction parallel with said aisle in use of said adjusting means.

6. A frame structure as set forth in claim 5 wherein each recited adjusting means is both expandible and contractible for moving said medial portions in either direction parallel with said aisle.

7. A frame structure comprising two parallel rows of substantially vertical, spaced aisle posts defining an aisle therebetween and a plurality of laterally open bays on either side of said aisle; parallel rows of substantially vertical outer posts spaced outwardly respectively from said aisle posts; each row of posts rigidly mounted at the bottom ends thereof on a substantially level base means; each row of posts connected together at their upper ends by a top stringer; cross ties disposed transversely to said aisle and connecting each laterally aligned group of aisle and outer posts; load support means carried by said posts and defining a plurality of load levels within said bays; diagonally disposed, longitudinally adjustable bracing means connected to the sides of said structure; at least certain of said bracing means being connected at one end to a peripheral member of the side of said frame structure and at the other end thereof to a structural member of said frame structure disposed inwardly from the periphery thereof; each said certain bracing means crossing at least two bays and two levels of said frame structure; diagonally disposed, longitudinally adjustable bracing means connected across the top of said frame structure; at least certain of said second mentioned bracing means being connected at one end adjacent to an outer post and at the other end thereof adjacent to an aisle post and crossing at least two bays; other of said second mentioned bracing means connected at the ends thereof to aisle posts on opposite sides of said aisle and extending along said aisle at least the length of two bays.

8. A storage frame having lateral storage openings on either side of an aisle and adapted for use with a vertically and horizontally movable carrier means disposed in said aisle; said frame comprising parallel rows of upright aisle posts defining said aisle; parallel rows of upright outer posts spaced laterally outwardly from said aisle posts respectively; each row of posts rigidly mounted at the bottom ends thereof on a substantially level base stringer; each row of posts connected together at their upper ends by a top stringer; cross ties disposed transversely to said aisle and connecting each laterally aligned group of aisle and outer posts; laterally directed, cooperating load support means carried by laterally aligned, adjacent pairs of aisle and outer posts and defining a plurality of load levels with said storage openings disposed above said levels; intermediate stringers connecting the medial portions of each row of aisle posts disposed parallel with said base and top stringers; at least one said intermediate stringer comprising a guide member for engaging a stabilizing arm of said carrier means; said one intermediate stringer comprising a channel shaped member for captively engaging a roller of a stabilizing arm of said carrier means; and adjusting means for optionally adjusting said one intermediate stringer laterally relative to said aisle at each associated aisle post.

9. In a frame structure having an aisle and storage openings opening laterally into said aisle from at least one side of said aisle: a plurality of vertically upright post members arranged in a row along one side of said aisle; means connecting the upper end portions of all of said members together; all of said members mounted at their lower ends to a fixed base; a truss mounted to the endmost member in said row and disposed in the plane of said row; stringer means connecting all of said members at a level intermediate the ends of said members; adjusting means connected between said truss and said endmost member and exerting a deflecting pressure upon the medial portion of said endmost member in at least one direction parallel with said aisle; said truss comprising a vertically disposed main beam rigidly mounted upon said fixed base and spaced from said endmost member; diagonally directed struts projecting from adjacent to the ends of said main beam and connected to said endmost member adjacent to its ends; said adjusting means connected to said main beam intermediate the upper and lower ends thereof.

10. A frame structure comprising two parallel rows of substantially vertical, spaced aisle posts defining an aisle therebetween and a plurality of laterally open bays on either side of said aisle; parallel rows of substantially vertical, outer posts spaced outwardly respectively from said aisle posts; each row of posts rigidly mounted at the bottom ends thereof on a substantially level base means; each row of posts connected together at their upper ends by a top stringer; cross ties disposed transversely to said aisle and connecting each laterally aligned group of aisle and outer posts; load support means carried by said posts and defining a plurality of load levels within said bays; diagonally disposed, longitudinally adjustable bracing means connected to the side of said structure; at least certain of said bracing means being connected at opposite ends thereof to structural members at the side of said frame structure with each said certain bracing means crossing at least two bays and two levels of said frame structure; diagonally disposed, longitudinally adjustable bracing means connected across the top of said frame structure; at least certain of said second-mentioned bracing means being connected at one end adjacent to an outer post and at the other end thereof adjacent to an aisle post and crossing at least two ways; other of said second mentioned bracing means connected at the ends thereof to aisle posts on opposite sides of said aisle and extending along said aisle at least the length of two bays.

References Cited by the Examiner

UNITED STATES PATENTS

| | | | |
|---|---|---|---|
| 860,149 | 7/07 | Platt | 214—16.42 X |
| 1,369,393 | 2/21 | Burgess. | |
| 1,569,366 | 1/26 | Goldberg | 211—182 |
| 1,815,429 | 7/31 | Canaday. | |
| 2,511,619 | 6/50 | Bowser. | |
| 2,549,239 | 4/51 | Robertson et al. | 214—16.42 X |
| 2,692,418 | 10/54 | Besser | 214—16.42 X |
| 2,815,130 | 12/57 | Franks | 211—182 |
| 2,894,641 | 7/59 | Edwards | 211—134 |
| 2,968,409 | 1/61 | Jurechko | 211—134 |
| 2,986,284 | 5/61 | Colbert | 211—134 |
| 2,989,193 | 6/61 | Smith | 211—183 |
| 3,040,906 | 6/62 | Hillger et al. | 211—183 |
| 3,048,245 | 8/62 | Shewell | 211—182 X |
| 3,127,995 | 4/64 | Mosinski | 211—148 |

HUGO O. SCHULZ, *Primary Examiner.*

GERALD M. FORLENZA, *Examiner.*